(12) United States Patent
Son et al.

(10) Patent No.: US 10,564,456 B2
(45) Date of Patent: Feb. 18, 2020

(54) DISPLAY APPARATUS

(71) Applicant: LG Display Co., Ltd., Seoul (KR)

(72) Inventors: Nam Do Son, Gyeongsangbuk-do (KR); Song Ryol You, Goyang-si (KR); Kyeong Tak Baek, Daegu (KR); Seong Rok Kim, Seoul (KR); Dong Yong Kim, Samcheok-si (KR); Ki Nam Jean, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/108,338

(22) Filed: Aug. 22, 2018

(65) Prior Publication Data

US 2018/0356674 A1 Dec. 13, 2018

Related U.S. Application Data

(62) Division of application No. 15/710,153, filed on Sep. 20, 2017, now Pat. No. 10,082,693, which is a division of application No. 12/982,496, filed on Dec. 30, 2010, now Pat. No. 9,804,429.

(30) Foreign Application Priority Data

Apr. 27, 2010 (KR) .................. 10-2010-0039024

(51) Int. Cl.
*G02F 1/1333* (2006.01)
(52) U.S. Cl.
CPC ............... *G02F 1/133308* (2013.01); *G02F 2001/133322* (2013.01); *G02F 2201/465* (2013.01)

(58) Field of Classification Search
CPC ......... G02F 1/133308; G02F 2201/465; G02F 2001/133322
See application file for complete search history.

(56) References Cited

U.S. PATENT DOCUMENTS

| 7,405,925 | B2* | 7/2008 | Sung | G02F 1/133308 345/905 |
| 7,443,460 | B2* | 10/2008 | Park | G02B 6/0086 349/58 |
| 7,557,869 | B2* | 7/2009 | Bang | G06F 3/0421 345/173 |
| 7,583,330 | B2* | 9/2009 | Kwon | G02B 6/0086 349/58 |

(Continued)

*Primary Examiner* — Jose R Soto Lopez
(74) *Attorney, Agent, or Firm* — Dentons US LLP

(57) ABSTRACT

Disclosed is a display apparatus which facilitates minimized thickness by innovatively removing a case and some portions of a set cover, which have been regarded as indispensable structures for the display apparatus, and simultaneously facilitates good aesthetic exterior appearance of the display apparatus by a novel design. The display apparatus comprises a set cover exposed externally to have a storage space; a support cover placed onto the storage space and formed to have a supporting space; a backlight unit received in the supporting space; a guide frame connected to the support cover while being supported by the support cover, and received in the storage space; and a liquid crystal display panel placed onto the guide frame, wherein the liquid crystal display panel displays images by adjusting transmittance of light emitted from the backlight unit.

19 Claims, 11 Drawing Sheets

(56) References Cited

U.S. PATENT DOCUMENTS

| | | | | |
|---|---|---|---|---|
| 7,671,933 B2* | 3/2010 | Park | G02B 6/0088 | 345/905 |
| 7,701,530 B2* | 4/2010 | Lee | G02F 1/133308 | 349/56 |
| 7,724,317 B2* | 5/2010 | Kim | G02F 1/133308 | 349/58 |
| 7,738,052 B2* | 6/2010 | Sohn | G02B 6/0088 | 349/58 |
| 7,929,072 B2* | 4/2011 | Oohira | G02F 1/133308 | 252/299.3 |
| 7,960,913 B2* | 6/2011 | Yee | H04N 5/645 | 313/512 |
| 8,008,570 B2* | 8/2011 | Han | G02F 1/133308 | 349/58 |
| 8,079,725 B2* | 12/2011 | Kuromizu | G02F 1/133608 | 362/558 |
| 8,113,706 B2* | 2/2012 | Lin | G02F 1/133615 | 349/58 |
| 8,164,573 B2* | 4/2012 | DaCosta | G06F 3/0418 | 178/18.01 |
| 8,223,291 B2* | 7/2012 | Kim | G02F 1/133308 | 349/149 |
| 8,223,292 B2* | 7/2012 | Yoshikawa | G02F 1/133608 | 349/58 |
| 8,325,291 B2* | 12/2012 | Oh | G02F 1/133308 | 345/87 |
| 8,350,979 B2* | 1/2013 | Kim | H05K 5/02 | 349/149 |
| 8,414,176 B2* | 4/2013 | Shin | G02B 6/009 | 362/628 |
| 2005/0162583 A1 | 7/2005 | Ozolins et al. | | |
| 2005/0285991 A1* | 12/2005 | Yamazaki | G02F 1/133308 | 349/58 |
| 2008/0151138 A1* | 6/2008 | Tanaka | G02F 1/133308 | 349/58 |
| 2008/0252808 A1* | 10/2008 | Chang | G02F 1/133608 | 349/58 |
| 2008/0273136 A1* | 11/2008 | Hisada | G02F 1/133308 | 349/58 |
| 2008/0278895 A1* | 11/2008 | Woo | G02F 1/133308 | 361/679.02 |
| 2008/0297679 A1* | 12/2008 | Jung | G02B 6/0088 | 349/58 |
| 2008/0303971 A1* | 12/2008 | Lee | G02F 1/133308 | 349/58 |
| 2009/0033826 A1* | 2/2009 | Shimizu | G02F 1/133308 | 349/58 |
| 2009/0115928 A1* | 5/2009 | Shin | G02F 1/133308 | 349/58 |
| 2009/0122221 A1* | 5/2009 | Lee | G02F 1/133308 | 349/58 |
| 2009/0147174 A1* | 6/2009 | Ha | G02F 1/133606 | 349/58 |
| 2009/0207126 A1* | 8/2009 | Arisato | G02F 1/133308 | 345/102 |
| 2009/0231508 A1* | 9/2009 | Sato | G02F 1/133528 | 349/58 |
| 2009/0316064 A1* | 12/2009 | Kono | G02B 6/009 | 349/58 |
| 2010/0014015 A1* | 1/2010 | Ho | G02F 1/133605 | 349/58 |
| 2010/0073594 A1* | 3/2010 | Miyazaki | G02F 1/133308 | 349/58 |
| 2010/0123850 A1* | 5/2010 | Miyashita | G02F 1/133308 | 349/58 |
| 2010/0130257 A1* | 5/2010 | Jang | G06F 3/016 | 455/566 |
| 2010/0171897 A1* | 7/2010 | Yun | G02F 1/133605 | 349/58 |
| 2010/0201906 A1* | 8/2010 | Fukayama | G02F 1/133308 | 349/58 |
| 2010/0203924 A1* | 8/2010 | Hirota | G02F 1/133308 | 455/566 |
| 2010/0253874 A1* | 10/2010 | Ito | G02F 1/133308 | 349/58 |
| 2010/0315570 A1* | 12/2010 | Mathew | G06F 1/1637 | 349/58 |
| 2011/0096569 A1* | 4/2011 | Hamada | G02B 6/0085 | 362/613 |
| 2011/0134346 A1* | 6/2011 | Hayashi | G02F 1/133308 | 348/790 |
| 2011/0149200 A1* | 6/2011 | Joo | G02F 1/133308 | 349/61 |
| 2011/0221995 A1* | 9/2011 | Park | G02F 1/13336 | 349/58 |
| 2011/0228191 A1* | 9/2011 | Hsu | G02F 1/13338 | 349/58 |
| 2011/0260960 A1* | 10/2011 | Jean | H04N 5/64 | 345/102 |
| 2011/0261282 A1* | 10/2011 | Jean | G02F 1/133308 | 349/58 |
| 2011/0273641 A1* | 11/2011 | Wakabayashi | G02F 1/133308 | 349/58 |
| 2012/0013824 A1* | 1/2012 | Yoshikawa | G02F 1/133608 | 349/62 |
| 2012/0050638 A1* | 3/2012 | Nussbacher | F25D 23/02 | 349/58 |

* cited by examiner

DISPLAY APPARATUS

CROSS REFERENCE TO RELATED APPLICATIONS

This application is a Divisional of application Ser. No. 15/710,153 filed on Sep. 20, 2017, which is a Divisional of application Ser. No. 12/982,496 filed on Dec. 30, 2010, now U.S. Pat. No. 9,804,429, issued on Oct. 31, 2017, which claims the benefit of Korean Patent Application No. 10-2010-0039024 filed on Apr. 27, 2010, the disclosures of which are hereby incorporated by reference for all purposes as if fully set forth herein.

BACKGROUND

Field of the Invention

The present invention relates to a display apparatus, and more particularly, to a display apparatus which facilitates minimized thickness by innovatively removing a case and some portions of a set cover, which have been regarded as indispensable structures for the display apparatus, and simultaneously facilitates to realize good aesthetic exterior appearance of the display apparatus by a novel design.

Discussion of the Related Art

Recently, various flat-type display devices have been actively developed and researched to decrease heavy weight and large volume which correspond to disadvantages of Cathode Ray Tubes (CRT), for example, Liquid Crystal Display (LCD) devices, Plasma Display Panels (PDP), Field Emission Display (FED) devices, Light Emitting Display (LED) devices, etc. Especially, among these devices, the LCD device has attracted great attention owing to its advantages such as ability to be mass produced, simple driving means, and high picture quality.

In addition to the technical aspects of the flat-type display apparatus, there is an increasing demand for research and development of flat-type display apparatus design. This research includes steady efforts toward minimization in thickness of the display apparatus (for example, slimness) while simultaneously increasing satisfactory designs which are capable of arousing customer's interest.

However, the existing design for the slimness and good aesthetic exterior appearance of the display apparatus has been developed by changing a structure of components included in the display apparatus under the circumstances that all components are used for the display apparatus. Thus, it limits the slimness of the display apparatus and the development of the new design.

For instance, a related art LCD device necessarily uses lower and upper cases to receive a liquid crystal display unit and a backlight unit therein. In addition, front and rear set covers are additionally used in the related art LCD device to manufacture notebook computers, monitors, mobile devices, or televisions. As the lower and upper cases and the front and rear set covers for the manufactured device are inevitably used in the display device, these limit the slimness of the display device and the development of the new design. Especially, the upper edges of the liquid crystal display panel are covered with the upper case and front set cover, whereby the liquid crystal display device is increased in its thickness. Also, the edge width of the liquid crystal display device is increased so that step coverage of the edge is increased, which might be an obstruction to the development of innovative design.

SUMMARY

Accordingly, the present invention is directed to a display apparatus that substantially obviates one or more problems due to limitations and disadvantages of the related art.

An advantage of the present invention is to provide a display apparatus which minimize thickness by innovatively removing a case and some portions of a set cover, which have been regarded as indispensable structures for the display apparatus, and simultaneously facilitates to realize a good aesthetic exterior appearance of the display apparatus by a novel design.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus comprising: a set cover exposed to the external to have a storage space; a support cover placed onto the storage space and formed to have a supporting space; a backlight unit received in the supporting space; a guide frame connected to the support cover while being supported by the support cover, and received in the storage space; and a liquid crystal display panel placed onto the guide frame, wherein the liquid crystal display panel displays images by adjusting transmittance of light emitted from the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to the present invention will be described with reference to the accompanying drawings.

Figure 1:
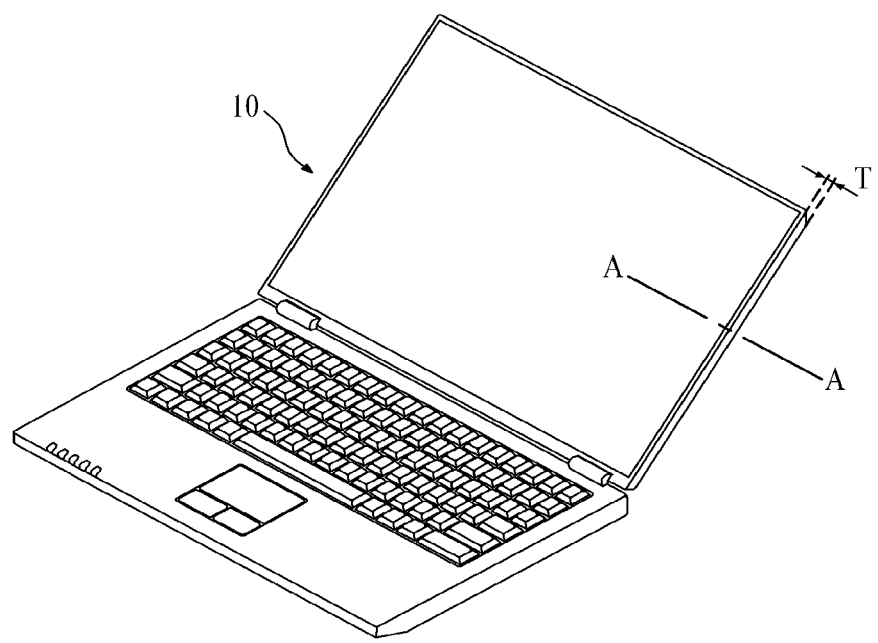
FIG. 1 illustrates a display apparatus used for a notebook computer according to an exemplary embodiment of the present invention.
Figure 2:
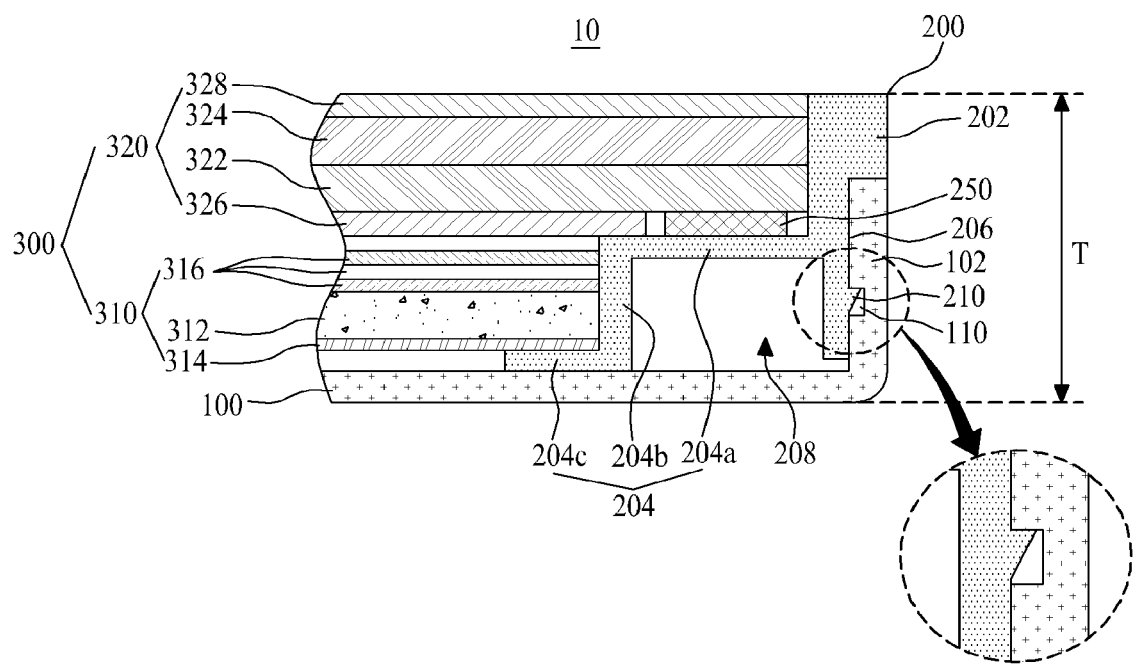
FIG. 2 is a cross section view along A-A of FIG. 1, which illustrates a display apparatus according to a first embodiment of the present invention.

FIG. 1 illustrates a display apparatus used for a notebook computer according to an embodiment of the present invention. FIG. 2 is a cross section view along A-A of FIG. 1, which illustrates a display apparatus according to a first exemplary embodiment of the present invention.

Referring to FIG. 2, the display apparatus 10 according to a first embodiment of the present invention may include a set cover 100, a guide frame 200, and a display unit 300.

The set cover 100 may be formed in a rectangular-shaped frame. At this time, the set cover 100 may be provided with a set plate and a set sidewall 102, wherein the set sidewall 102 may be vertically curved from the set plate so as to form a predetermined space. The set cover 100 may support the guide frame 200 and the display unit 300, and simultaneously covers the lateral side of the guide frame 200. In this case, the set cover 100 may be formed of a plastic material or metal material. For the aesthetic exterior appearance, the set cover 100 may be formed of the metal material, preferably.

The guide frame 200, which may be received in the predetermined space of the set cover 100, may support the display unit 300. For this, the guide frame 200 may comprise a guide sidewall 202, a supporter 204, a set sidewall insertion groove 206, and a plurality of first coupling members 210.

The guide sidewall 202 may be vertically formed to cover the lateral side of the display unit 300. In this case, the upper surface of the guide sidewall 202 may be exposed to the external so as to cover the lateral side of the display unit 300, whereby the upper surface of the guide sidewall 202 may form the frontal edge of the display unit 300.

The supporter 204 may protrude from the guide sidewall 202 while being in opposite to the set sidewall 102, to thereby support the display unit 300. For this, the supporter 204 may comprise a first part 204a, a curved part 204b, and a second part 204c.

The first part 204a may protrude from the guide sidewall 202 while being in parallel to the set plate.

The curved part 204b may be vertically curved from one end of the first part 204a toward the set plate.

The second part 204c may be curved from one end of the curved part 204b while being in parallel to the set plate and being placed onto the set plate.

The set sidewall insertion groove 206 may be hollowly formed in the lower outer surface of the guide sidewall 202 except the upper outer surface of the guide sidewall 202. The set sidewall insertion groove 206 may be covered by the set sidewall 102 inserted thereinto.

The plurality of first coupling members 210 may be formed in the set sidewall insertion groove 206, and may then connected to the set sidewall 102 of the set cover 100. For this, the plurality of first coupling members 210 may protrude from the outer surface of the set sidewall insertion groove 206, wherein each of the plural first coupling members 210 may include a stepped surface, and a slant surface which is inclined by a predetermined angle.

In the inner surface of the set sidewall 102, a plurality of second coupling members 110 may be formed to be respectively coupled to the plurality of first coupling members 210. Each of the plural second coupling members 110 may be formed in a groove shape to be coupled to the slant surface of each of the plural first coupling members 210, to thereby prevent a separation of the guide frame 200.

Each of the plural first coupling members 210 may be inserted into and coupled to each of the plural second coupling members 110, whereby the set cover 100 and the guide frame 200 are coupled to each other.

Meanwhile, the guide frame 200 may further comprise an empty room 208 between the curved part 204b of the supporter 204 and the guide sidewall 202. An antenna or antenna wire used for the notebook computer may be arranged in the empty room 208.

A color of the guide frame 200 may be the same as a color displayed for a non-driving mode of the display unit 300. For example, it is preferable that the guide frame 200 have a black color.

The display unit 300 may comprise a backlight unit 310 and a liquid crystal display panel 320.

The backlight unit 310, which may be placed onto the second part 204c of the guide frame 200, emits light to the rear surface of the liquid crystal display panel 320. At this time, the rear side of the backlight unit 310 may be supported by the second part 204c of the guide frame 200, and the lateral side of the backlight unit 310 may be covered by the curved part 204b of the guide frame 200. The backlight unit 310 may comprise a light guide plate 312, a reflective sheet 314, and an optical member 316.

The light guide plate 312 may be formed in a flat type to have a light-incidence surface, whereby the light guide plate 312 guides the light, which is emitted from a light source (not shown) and is then incident on the light-incidence surface, toward the liquid crystal display panel 320. At this time, the light source (not shown) may be formed to include a fluorescent lamp or light emitting diode.

The reflective sheet 314 may be arranged on the rear surface of the light guide plate 312, and is also placed onto the second part 204c of the guide frame 200. The reflective sheet 314 reflects the light from the light guide plate 312 toward the liquid crystal display panel 320.

The optical member 316, which may be provided on the light guide plate 312, improves a luminance property of the light advancing toward the liquid crystal display panel 320 from the light guide plate 312. For this, the optical member 316 may comprise at least two sheets of a lower diffusion sheet, a lower prism sheet, an upper prism sheet, and an upper diffusion sheet.

The lower diffusion sheet, which is arranged on the light guide plate 312, diffuses the light incident from the light guide plate 312, and applies the diffused light to the lower prism sheet.

The lower prism sheet, which may be arranged on the lower diffusion sheet, concentrates the light incident from the lower diffusion sheet into a first direction, and applies the concentrated light to the upper prism sheet. At this time, the first direction may correspond to a long or short side direction of the light guide plate 312.

The upper prism sheet, which may be arranged on the lower prism sheet, concentrates the light incident from the lower prism sheet into a second direction, and applies the concentrated light to the upper diffusion sheet. At this time, the second direction may be perpendicular to the first direction. According to the structure of the backlight unit 310, the upper prism sheet may be omitted. Also, the lower and upper prism sheets may be substituted by one prism sheet including first and second light-concentrating patterns to concentrate the light from the lower diffusion sheet into the first and second directions. Furthermore, the first and second light-concentrating patterns may be formed on the lower diffusion sheet. If the first and second light-concentrating patterns are formed on the lower diffusion sheet, the lower and upper prism sheets may be omitted.

The upper diffusion sheet, which may be arranged on the upper prism sheet, diffuses the light incident from the upper prism sheet, and applies the diffused light to the liquid crystal display panel 320. At this time, if the upper prism sheet is omitted, the upper diffusion sheet may be arranged on the lower prism sheet to diffuse the light incident from the lower prism sheet and to apply the diffused light to the liquid crystal display panel 320. Also, if both the lower and upper prism sheets are omitted, the upper diffusion sheet may diffuse the light incident from the lower diffusion sheet with the first and second light-concentrating patterns, and apply the diffused light to the liquid crystal display panel 320.

The liquid crystal display panel 320 is placed onto the first part 204a of the guide frame 200, and is arranged on the backlight unit 310, whereby the liquid crystal display panel 320 adjusts a transmittance of the light emitted from the backlight unit 310, to thereby display a predetermined image. At this time, the rear side of the liquid crystal display panel 320 may placed onto the first part 204a of the guide frame 200, and the lateral side of the liquid crystal display panel 320 may be covered by the guide sidewall 202 of the guide frame 200.

The liquid crystal display panel 320 may be placed onto the first part 204a of the guide frame 200 through the use of adhesive member 250. At this time, the adhesive member 250 may be a double-sided tape. The adhesive member 250 may be adhered onto the edge of the rear surface of the liquid crystal display panel 320 or onto the first part 204a of the guide frame 200, whereby the liquid crystal display panel 320 and the guide frame 200 are stably connected to each other.

The liquid crystal display panel 320 may comprise a lower substrate 322, an upper substrate 324, a lower polarizing plate 326, and an upper polarizing plate 328.

The lower substrate 322 may include a plurality of pixels (not shown) in every regions formed by crossing a plurality of gate lines (not shown) and data lines (not shown). Each pixel may comprise a thin film transistor (not shown) connected to the gate and data lines; a pixel electrode connected to the thin film transistor; and a common electrode formed adjacent to the pixel electrode, wherein a common voltage is applied to the common electrode. The common electrode may be formed on the upper substrate 324 according to a driving mode of liquid crystal layer. The lower substrate 322 may form an electric field corresponding to a differential voltage between the common voltage and data voltage applied to each pixel, to thereby adjust the light transmittance of liquid crystal layer.

The aforementioned adhesive member 250 may be adhered onto the edge of the lower substrate 322 or the first part 204a, whereby the lower substrate 322 and the guide frame 322 may be connected to each other.

The upper substrate 324 may be formed to have a color filter corresponding to each pixel of the lower substrate 322. The lower and upper substrates 322 and 324 may be bonded to each other with the liquid crystal layer interposed therebetween. At this time, the common electrode supplied with the common voltage may be formed on the upper substrate 324 according to the driving mode of the liquid crystal layer. The incident light passing through the liquid crystal layer may be filtered through the color filter of the upper substrate 324 so that the predetermined colored light is emitted to the external. Accordingly, the predetermined colored image may be displayed on the liquid crystal display panel 320.

Meanwhile, a detailed structure of the lower and upper substrates 322 and 324 may vary according to the driving mode of the liquid crystal display panel 320, for example, Twisted Nematic (TN) mode, Vertical Alignment (VA) mode, In-Plane Switching (IPS) mode, Fringe Field Switching (FFS) mode, and etc., which are generally known to those skilled in the art.

The lower polarizing plate 326 may be formed on the rear surface of the lower substrate 322, wherein the lower polarizing plate 326 polarizes the light incident from the backlight unit 310, and applies the polarized light to the lower substrate 322. While being overlapped with the optical member 316 of the backlight unit 310, the lower polarizing plate 326 may be adhered onto the remaining regions except the edge of the rear surface of the lower substrate 322 with the aforementioned adhesive member 250 adhered thereonto.

The upper polarizing plate 328 may be formed on the entire surface of the upper substrate 324, whereby the light incident through the upper substrate 324 is polarized by the upper polarizing plate 328, and the polarized light is emitted to the external.

The aforementioned display unit 300 may be formed of a light emitting display unit including a light emitting display panel with an organic light emitting device, instead of the liquid crystal display unit including the backlight unit 310 and the liquid crystal display panel 320. In this case, the guide frame 200 may comprise the first part 204a which supports the guide sidewall 202 covering the lateral surface of the light emitting display unit and the rear surface of the light emitting display unit; the set sidewall insertion groove 206 which is formed in the guide sidewall 202, wherein the set sidewall 102 of the set cover 100 may be inserted into the set sidewall insertion groove 206; and the plurality of first coupling members 210 which may be formed in the set sidewall insertion groove 206, wherein the plurality of first coupling members 210 are respectively coupled to the plurality of second coupling members 110.

Figure 3:
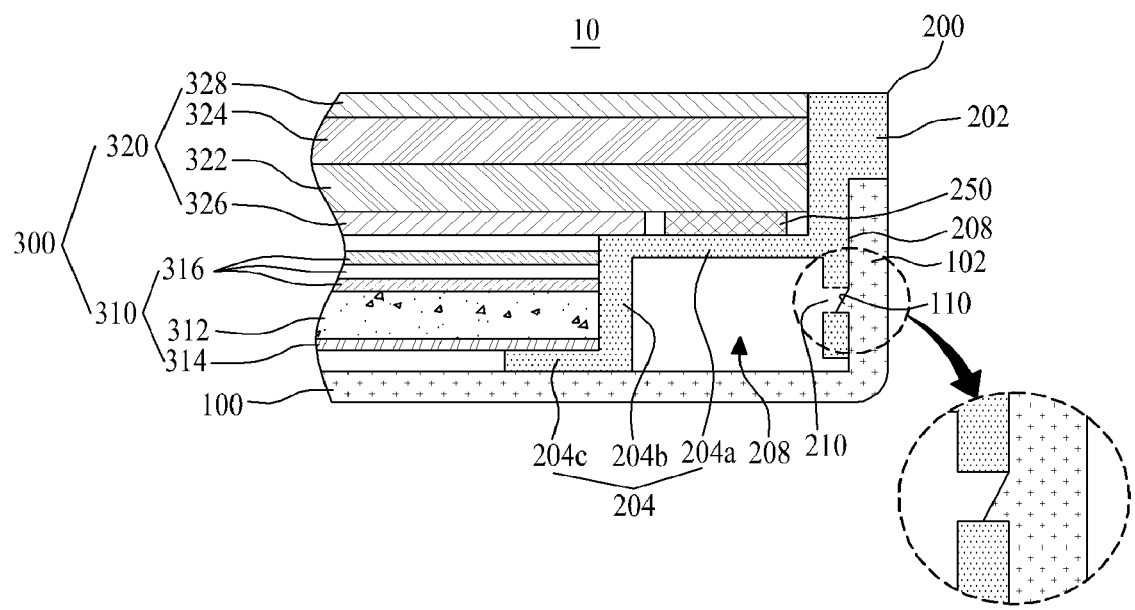
FIG. 3 illustrates another exemplary embodiment of first and second coupling members shown in FIG. 2.

In the display apparatus 10 according to the first exemplary embodiment of the present invention, the plurality of first coupling members 210 in the protrusion type may be formed along the guide sidewall 202, and the plurality of second coupling members 110 in the groove type may be formed along the set sidewall 102, but not necessarily. The first and second coupling members 210 and 110 may be formed in various shapes appropriate for their coupling. For example, as shown in FIG. 3, the plurality of first coupling members 210 may be formed as a groove or hole along the guide sidewall 202; and the plurality of second coupling members 110 may be formed as a protrusion along the set sidewall 102.

The display apparatus 10 according to the first exemplary embodiment of the present invention may support the display unit 300 through the use of guide frame 200, and connects the guide frame 200 and the set cover 100 to each other, so that it is possible to decrease a total thickness (T) of the device by omitting lower and upper cases, and a front cover of product, which have been essentially used for the related art display apparatus.

In the display apparatus 10 according to the first embodiment of the present invention, the upper surface of the guide sidewall 202 may be exposed to the external so as to cover the lateral surface of the display unit 300, whereby the upper surface of the guide sidewall 202 forms the frontal edge of the display unit 300. Thus, there is no requirement for an additional structure for covering the upper edge of the display unit 300 and the lateral side of the guide frame 200, to thereby decrease the total thickness (T) of the display apparatus.

The display apparatus 10 according to the first embodiment of the present invention may minimize the border of the display unit 300 by exposing only the liquid crystal display panel 320 and guide sidewall 202 to a user. Thus, the good aesthetic exterior appearance of the display apparatus may be realized owing to the minimized border of the display unit 300.

Figure 4:
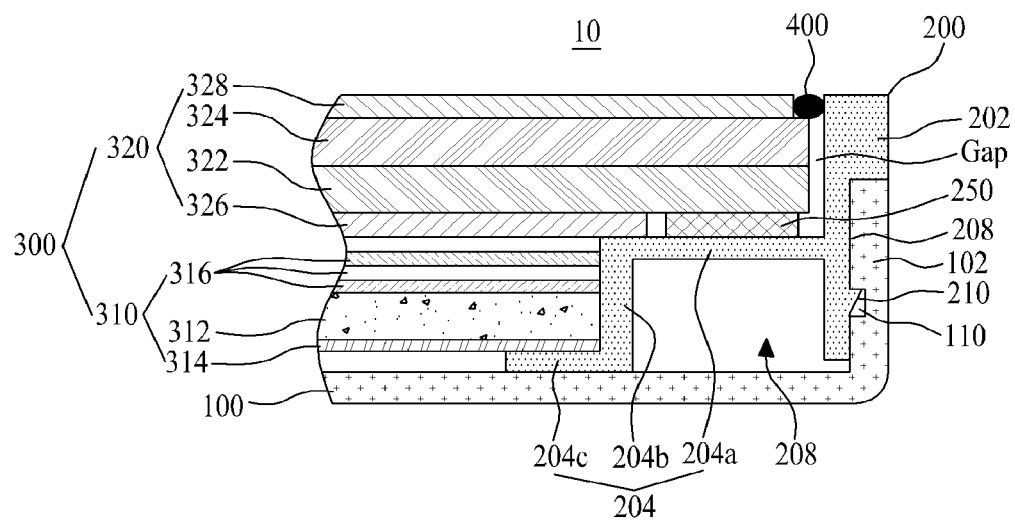
FIG. 4 illustrates a display apparatus according to a second exemplary embodiment of the present invention.

FIG. 4 illustrates a display apparatus according to the second exemplary embodiment of the present invention.

Referring to FIG. 4, the display apparatus 10 according to the second embodiment of the present invention may include a set cover 100, a guide frame 200, a display unit 300, and a sealing member 400. Except the sealing member 400, the display apparatus 10 according to the second embodiment of the present invention may be identical in structure to the display apparatus according to the first embodiment of the present invention shown in FIGS. 2 and 3, whereby a detailed explanation for the same parts will be omitted.

First, when manufacturing the display unit 300, that is, liquid crystal display panel 320 and guide frame 200, a gap may occur between a lateral side of the liquid crystal display panel 320 and a guide sidewall 202 of the guide frame 200 due to a manufacturing error. Accordingly, the sealing member 400 may seal the gap between the lateral side of the liquid crystal display panel 320 and the guide frame 200, and may thereby prevent foreign matters such as dust from coming into the inside of the display apparatus through the gap. At this time, a color of the sealing member 400 may be the same as a color of the guide frame 200, which allows good aesthetic exterior appearance of the display apparatus by preventing a color difference between the sealing member 400 and the guide frame 200.

For this, the sealing member 400 according to the first embodiment of the present invention may be formed in a ring shape. The ring-shaped sealing member 400 may be inserted into the gap between the lateral side of the liquid crystal display panel 320 and the guide frame 200, to thereby seal the gap. Thus, it is possible to prevent foreign matters such as dust from coming into the inside of the display apparatus through the gap.

Figure 5:
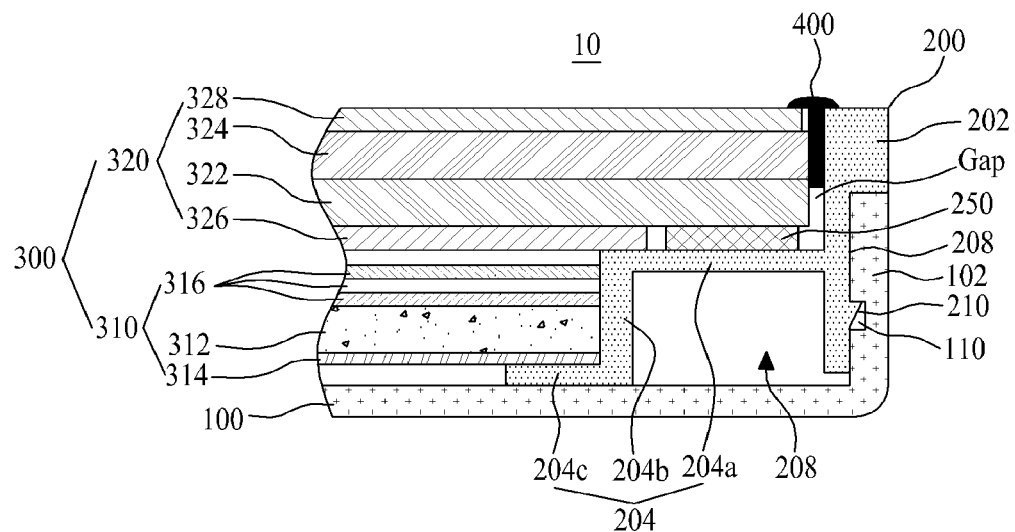
FIG. 5 illustrates the second embodiment of the sealing member shown in FIG. 4.

As shown in FIG. 5, the sealing member 400 according to the second embodiment of the present invention may be formed in a pin shape including a semicircular head, and a head supporter for supporting the semicircular head. At this time, the head supporter may be inserted into the gap, and the head is overlapped with the edge of the liquid crystal display panel 320 and the upper surface of the guide sidewall 202 so as to cover the gap. Accordingly, the sealing member 400 may seal the gap between the lateral side of the liquid crystal display panel 320 and the guide frame 200, to thereby prevent foreign matters such as dust from coming into the inside of the display apparatus through the gap.

Figure 6:
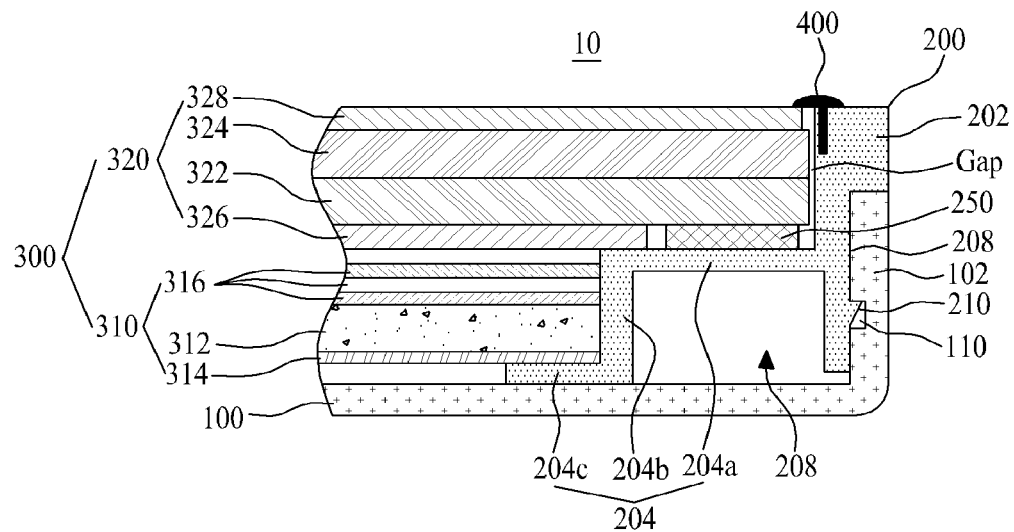
FIG. 6 illustrates a third exemplary embodiment of the sealing member shown in FIG. 4.

As shown in FIG. 6, the sealing member 400 according to the third exemplary embodiment of the present invention may comprise a semicircular head which covers the gap between the lateral side of the liquid crystal display panel 320 and the guide sidewall 202 of the guide frame 200; and a head supporter which may be formed as one body with the upper inner portion of the guide sidewall 202 so as to support the head. In this case, the sealing member 400 may be formed simultaneously with the guide frame 200. That is, the sealing member 400 and the guide frame 200 may be formed by a double injection molding method. Accordingly, the sealing member 400 may seal the gap between the lateral side of the liquid crystal display panel 320 and the guide sidewall 202, to thereby prevent foreign matters such as dust from coming into the inside of the display apparatus through the gap.

Figure 7:
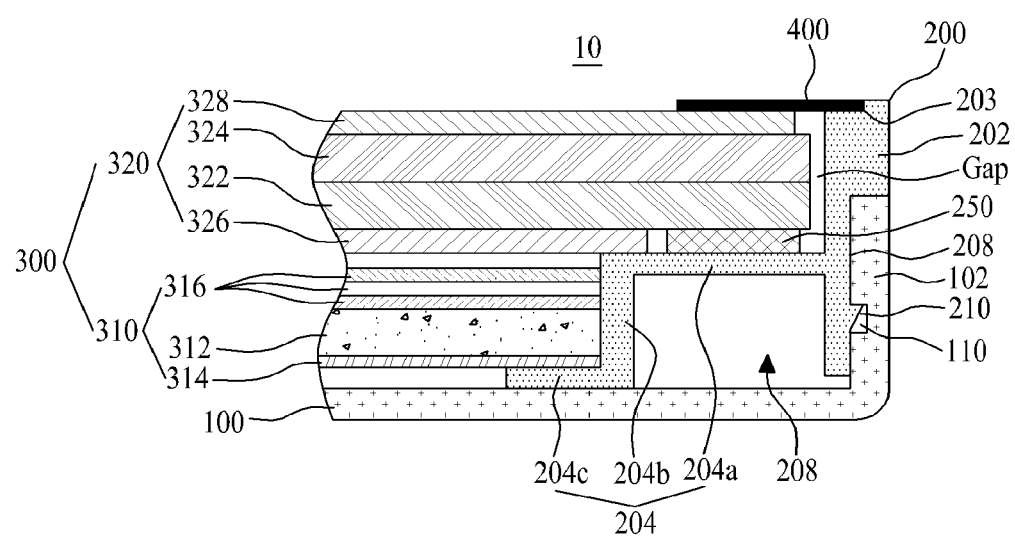
FIG. 7 illustrates a fourth exemplary embodiment of the sealing member shown in FIG. 4.

As shown in FIG. 7, the sealing member 400 according to the fourth embodiment of the present invention may be formed in a film type which is adhered to the upper edge of the liquid crystal display panel 320 and simultaneously to the partial portion of the upper surface of the guide frame 200, to thereby seal the gap between the lateral side of the liquid crystal display panel 320 and the guide sidewall 202 of the guide frame 200. In this case, the film-type sealing member 400 may have 0.2t thickness, but not necessarily. The thickness of the sealing member 400 may be determined within a range to minimize step coverage with the liquid crystal display panel 320, which enables the good aesthetic exterior appearance of the display apparatus.

Meanwhile, if the film-type sealing member 400 is adhered to the entire upper surface of the guide sidewall 202, the sealing member 400 may be peeled off by a user's contact. In this respect, the sealing member 400 may be adhered to the partial portion of the upper surface of the guide sidewall 202. For this, a sealing member adhesion groove 203 may be formed in the upper surface of the guide sidewall 202, and the sealing member 400 may be adhered to the sealing member adhesion groove 203. Accordingly, the film-type sealing member 400 may be adhered to the liquid crystal display panel 320, that is, between the upper edge of upper polarizing plate and the sealing member adhesion groove 203 of the guide frame 200, to thereby seal the gap between the lateral side of the liquid crystal display panel 320 and the guide sidewall 202. Thus, it is possible to prevent foreign matters such as dust from coming into the inside of the display apparatus through the gap.

Figure 8:
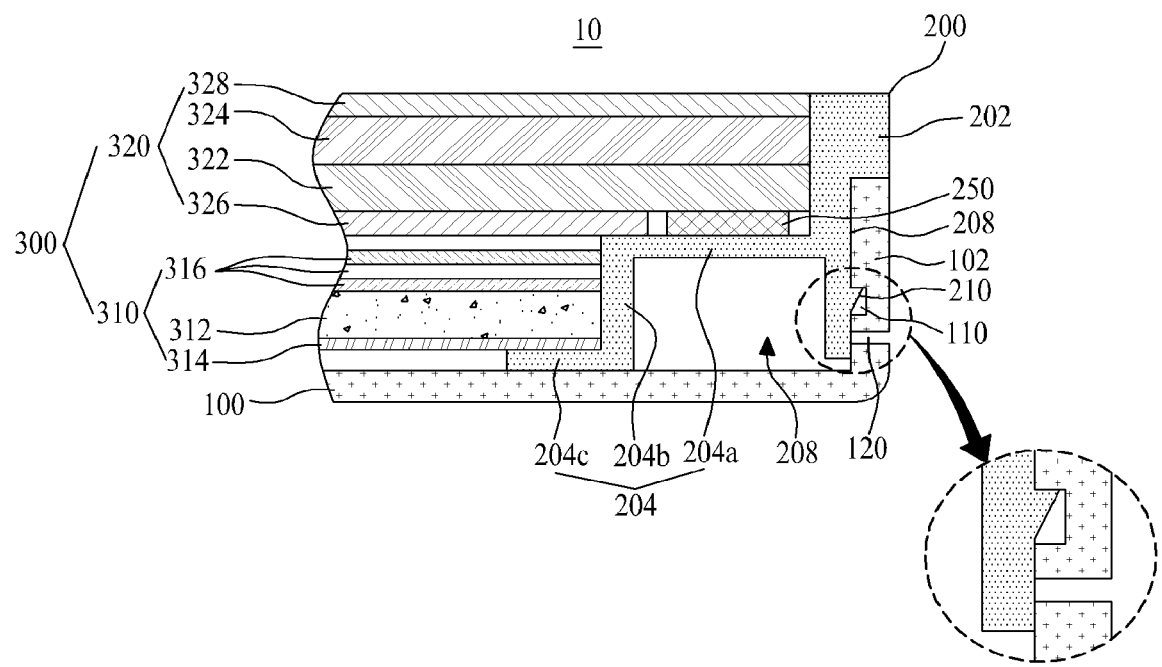
FIG. 8 illustrates a display apparatus according to the third embodiment of the present invention.

FIG. 8 illustrates a display apparatus according to the third exemplary embodiment of the present invention.

Referring to FIG. 8, the display apparatus 10 according to the third embodiment of the present invention may include a set cover 100, a guide frame 200, a display unit 300, and a plurality of separation holes 120. Except the separation holes 120, the display apparatus according to the third embodiment of the present invention may be identical in structure to the display apparatus according to the first embodiment of the present invention shown in FIGS. 2 and 3, whereby a detailed explanation for the same parts will be omitted.

The plurality of separation holes 120 may be provided adjacent to a plurality of second coupling members 110 in a set sidewall 102 of the set cover 100 by penetrating a predetermined portion of the set sidewall 102. When separating the guide frame 200 from the set cover 100 for a rework of the display apparatus 10, the separation hole 120 may enable an easy separation between the guide frame 200 and the set cover 100. Meanwhile, since the plurality of separation holes 120 are exposed at the lateral side of the manufactured display apparatus, each of the plural separation holes 120 may be sealed by an additionally-provided separable sealing cap (not shown) so as to realize good aesthetic exterior appearance of the display apparatus.

Figure 9:
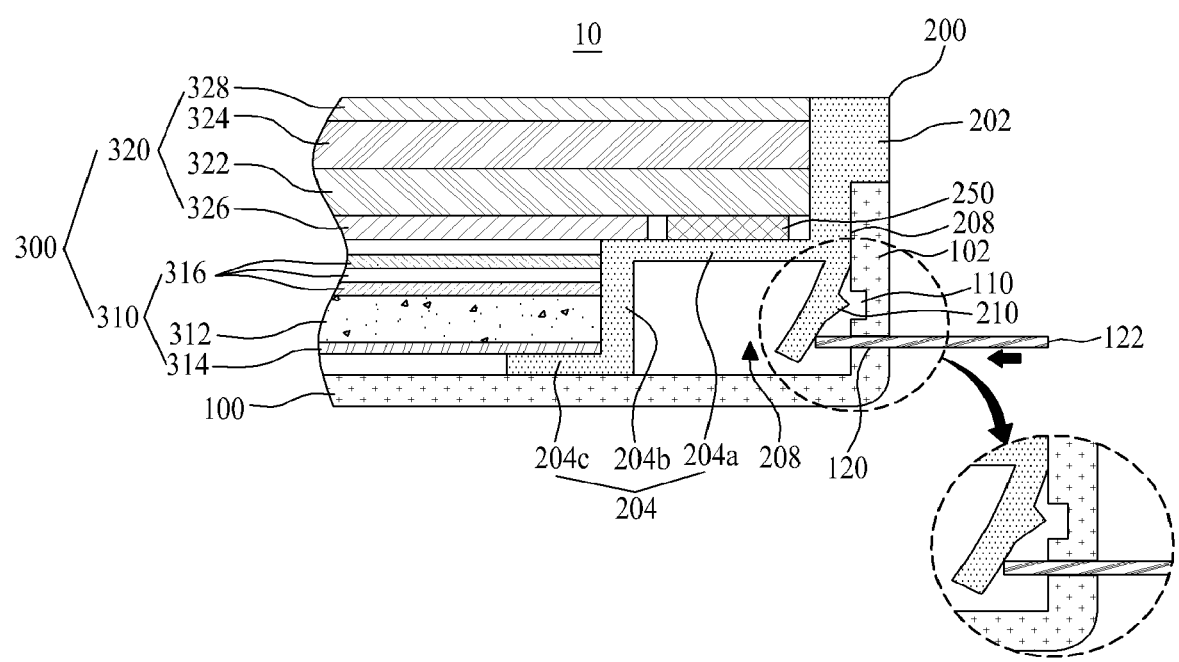
FIG. 9 illustrates a separation between a guide frame and a set cover through the use of separation hole inserted into a separation hole shown in FIG. 8.

In more detail, when separating the guide frame 200 from the set cover 100 for the rework of the display apparatus 100, a worker may first separate the sealing cap from the separation hole 120, as shown in FIG. 9, and then may insert an additional separation pin member 122 into the separation hole 120, whereby the guide sidewall 202 of the guide frame 200 may be forcibly pushed so that the first coupling member 210 is separated from the second coupling member 110. Accordingly, the worker may separate the guide frame 200 from the set cover 100 with ease.

For the aforementioned explanation, the separation hole 120 may be formed in the set sidewall 102 while being adjacent to the plurality of second coupling members 110, but not necessarily. Instead, the separation hole 120 may penetrate through the plurality of second coupling members 110 of the groove type. At this time, the separation hole 120 may be formed in the plurality of second coupling members 110 and exposed externally and may be sealed by the aforementioned sealing cap.

The display apparatus 10 according to the third embodiment of the present invention may additionally comprise any one among the sealing members 400 according to the first to fourth exemplary embodiments of the present invention shown in FIGS. 4 to 7.

The display apparatus 10 according to the third embodiment of the present invention may provide the same effect as those of the aforementioned first and second embodiments of the present invention, and allows the separation between the guide frame 200 and the set cover 100 with ease through the use of separation pin member 122 inserted into the separation hole 120.

Figure 10:
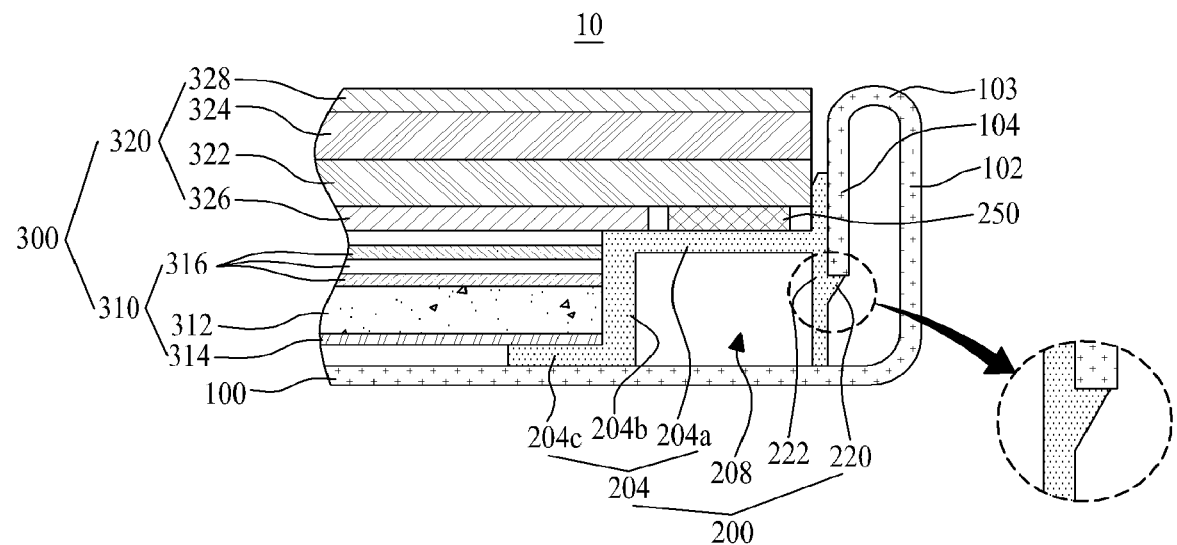
FIG. 10 illustrates a display apparatus according to a fourth exemplary embodiment of the present invention.

FIG. 10 illustrates a display apparatus according to the fourth exemplary embodiment of the present invention.

Referring to FIG. 10, the display apparatus 10 according to the fourth embodiment of the present invention may include a set cover 100, a guide frame 200, and a display unit 300. Except the set cover 100 and the guide frame 200, the display apparatus according to the fourth embodiment of the present invention may be identical in structure to the display apparatus according to the first embodiment of the present invention shown in FIGS. 2 and 3, whereby a detailed explanation for the same parts will be omitted.

The set cover 100 may comprise a set plate, a set sidewall 102, a bending part 103, and an inner sidewall 104.

The set plate supports the guide frame 200 onto which the display unit 300 is placed.

The set sidewall 102 may be vertically bent from the set plate, to thereby provide a predetermined space for receiving the guide frame 200 therein.

The bending part 103 with a predetermined curvature may be bent from one end of the set sidewall 102 toward the display unit 300. The bending part 103 may be exposed to the external so as to cover the lateral side of the display unit 300, whereby the bending part 103 may form the frontal edge of the display unit 300.

The inner sidewall 104 may be vertically extended from one end of the bending part 103 while being in parallel to the set sidewall 102, and may then connect to the guide frame 200.

The guide frame 200 may be connected to the inner sidewall 104 of the set cover 100, so that the guide frame 200 supports the display unit 300 received inside the set cover 100. At this time, a color of the guide frame 200 may be the same as a color displayed for a non-driving mode of the display unit 300. For example, it is preferable that the guide frame 200 have a black color. For this, the guide frame 200 may comprise a guide sidewall 222, a supporter 204, and a first coupling member 220.

The guide sidewall 222 may be formed in parallel to the set sidewall 102, to thereby cover some parts of the lateral side of the display unit 300.

The supporter 204 may protrude from the guide sidewall 222 while being in an opposite direction to the set sidewall 102, to thereby support the display unit 300. For this, the supporter 204 comprises a first part 204a, a curved part 204b, and a second part 204c, which may be identical to those of the first embodiment of the present invention, whereby a detailed explanation for structures of the first part 204a, curved part 204b, and second part 204c will be omitted.

Meanwhile, the guide frame 200 may further comprise an empty room 208 between the guide sidewall 222 and the curved part 204b. An antenna or antenna wire used for a notebook computer, and a power supply cable of the backlight unit 310 may be arranged in the empty room 208.

The plurality of first coupling members 220 may be formed in the guide sidewall 222, and are connected to the inner sidewall 104 of the set cover 100. For this, the plurality of first coupling members 220 may protrude from the outer surface of the guide sidewall 222, wherein each of the plurality of first coupling members 220 include a stepped surface, and a slant surface which is inclined by a predetermined angle. Accordingly, as the stepped surface of each of the plurality of first coupling members 220 is constrained by a lower end of the inner sidewall 104, the set cover 100 and the guide frame 200 may be connected to each other. At this time, the inner sidewall 104 may be defined as the second coupling member connected to the first coupling member 220.

In the display apparatus 10 according to the fourth embodiment of the present invention, the bending part 103 in the set cover 100 may be connected to the guide frame 200, and the lateral side of the display unit 300 may be covered by the bending part 103, to thereby decrease a total thickness of the display apparatus, and to realize good aesthetic exterior appearance through the bending part 103.

Figure 11:
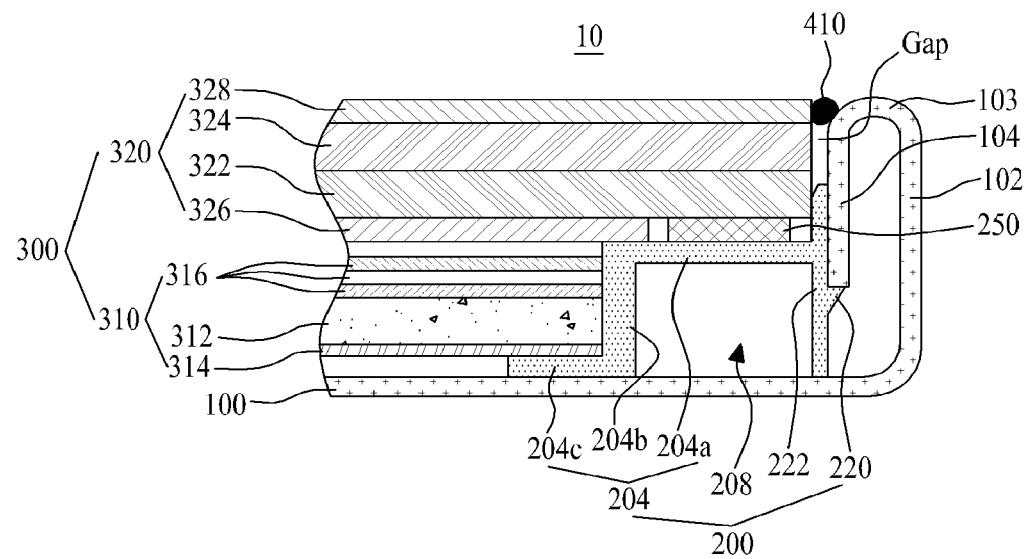
FIG. 11 illustrates a display apparatus according to a fifth exemplary embodiment of the present invention.

FIG. 11 illustrates a display apparatus according to the fifth exemplary embodiment of the present invention.

Referring to FIG. 11, the display apparatus 10 according to the fifth embodiment of the present invention may include a set cover 100, a guide frame 200, a display unit 300, and a sealing member 410. Except the sealing member 410, the display apparatus 10 according to the fifth embodiment of the present invention may be identical in structure to the display apparatus according to the fourth embodiment of the present invention shown in FIG. 10, whereby a detailed explanation for the same parts will be omitted.

The sealing member 410 according to the first embodiment of the present invention may be formed in a ring shape which is inserted into a gap between a lateral side of a liquid crystal display panel 320 and a bending part 103 so as to seal the gap. This may be identical to the sealing member 400 of the first embodiment in the aforementioned display apparatus according to the second embodiment of the present invention.

Figure 12:
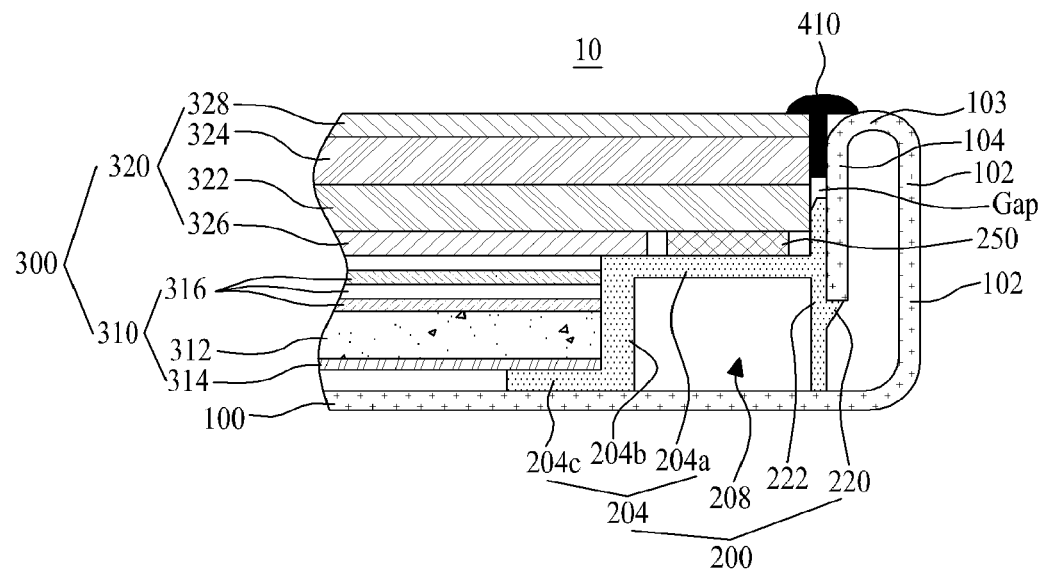
FIG. 12 illustrates a second exemplary embodiment of the sealing member shown in FIG. 11.

As shown in FIG. 12, the sealing member 410 according to the second embodiment of the present invention may be formed in a pin shape which may be inserted into the gap between the lateral side of the liquid crystal display panel 320 and the bending part 103 so as to seal the gap. This may be identical to the sealing member 400 of the second embodiment in the aforementioned display apparatus according to the second embodiment of the present invention. That is, the pin-shaped sealing member 410 may comprise a semicircular head, and a head supporter for supporting the semicircular head.

The display apparatus 10 according to the fifth embodiment of the present invention may seal the gap between the lateral side of the liquid crystal display panel 320 and the bending part 103 through the use of ring-shaped or pin-shaped sealing member 410, so that it may be possible to prevent foreign matters such as dust from coming into the inside of the display apparatus through the gap. This may enable to provide the same effects as those of the aforementioned display apparatus according to the fourth embodiment of the present invention.

Figure 13:
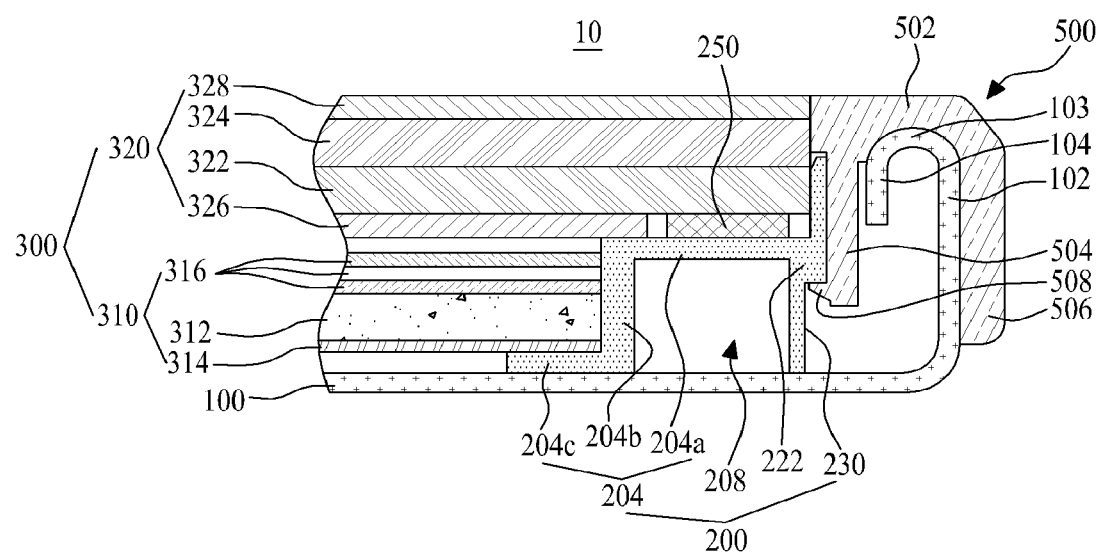
FIG. 13 illustrates a display apparatus according to a sixth exemplary embodiment of the present invention.

FIG. 13 illustrates a display apparatus according to the sixth exemplary embodiment of the present invention.

Referring to FIG. 13, the display apparatus 10 according to the sixth embodiment of the present invention may include a set cover 100, a guide frame 200, a display unit 300, and an edge frame 500. Except the guide frame 200 and edge frame 500, the display apparatus 10 according to the sixth embodiment of the present invention may be identical to the display apparatus according to the fourth embodiment of the present invention shown in FIG. 10, whereby a detailed explanation for the same part will be omitted.

The guide frame 200, which may be received inside the set cover 100, supports the display unit 300. At this time, a color of the guide frame 200 may be the same as a color displayed for a non-driving mode of the display unit 300. For example, it is preferable that the guide frame 200 have a black color.

The guide frame 200 may comprise a guide sidewall 222, a supporter 204, and a first coupling member 230.

The guide sidewall 222, which may be formed in parallel to a set sidewall 102 of the set cover 100, covers the lateral side of the display unit 300. At this time, the guide sidewall 222 may be provided at a predetermined interval from a bending part 103.

The supporter 204 protruding from the guide sidewall 222 may be formed in opposite to the set sidewall 102, to thereby support the display unit 300. For this, the supporter 204 may comprise a first part 204a, a curved part 204b, and a second part 204c, which may be identical to those of the first embodiment of the present invention, whereby a detailed explanation for structures of the first part 204a, curved part 204b, and second part 204c will be omitted.

The first coupling member 230 may be hollowly formed to have a stepped surface in the outer lower surface of the guide sidewall 222, and may be connected to the edge frame 500.

Meanwhile, the guide frame 200 may further comprise an empty room 208 between the guide sidewall 222 and the curved part 204b. An antenna or antenna wire used for a notebook computer, and a power supply cable of the backlight unit 310 may be arranged in the empty room 208.

The guide frame 200 may be connected to the set cover 100 through the use of adhesive member (for example, double-sided tape, not shown) formed between the second part 204c and the set plate of the set cover 100.

The edge frame 500 may be formed in shape "∩" to be connected to the guide frame 200. The ∩-shaped edge frame 500 may be inserted between the lateral side of the display unit 300 and the inner sidewall 104 of the set cover 100, and simultaneously cover the bending part 103 of the set cover 100 and the outer side of the set sidewall 102, whereby the edge frame 500 forms the frontal edge of the display unit 300. For this, the edge frame 500 may comprise a front part 502, an inner protrusion 504, an outer protrusion 506, and a plurality of second coupling members 508.

The front part 502, which may be arranged to be in contact with the lateral side of the display unit 300, may cover the space between the lateral side of the liquid crystal display panel 320 and the bending part 103, and also may cover the entire sides of the bending part 103, to thereby form the frontal edge of the display unit 300.

The inner protrusion 504, which may vertically protrude from one end of the front part 502, may be inserted into the space between the lateral side of the display unit 300 and the inner sidewall 104 of the set cover 100, to thereby seal the space between the lateral side of the display unit 300 and the bending part 103.

The outer protrusion 506, which may vertically protrude from the other end of the front part 502, may cover the outer sides of the set sidewall 102.

The set sidewall 102, bending part 103, and inner sidewall 104 of the set cover 100 may be inserted into the ∩-shaped space prepared between the inner protrusion 504 and the outer protrusion 506.

The plurality of second coupling members 508 may be provided at fixed intervals, wherein the plurality of second coupling members 508 may protrude from the outer surface of the inner protrusion 504 toward the guide frame 200. Each of the plural second coupling members 508 may include a slant portion which is provided for a smooth connection to the guide frame 200; and a stepped portion which is coupled to the stepped surface of frame connection groove 230 in the guide frame 200.

The display apparatus 10 according to the sixth embodiment of the present invention may cover the structures provided at the lateral side of the display unit 300 through the use of edge frame 500 connected to the guide frame 200, to thereby prevent the foreign matters from coming into the inside of the display apparatus. This may enable to provide the same effects as those of the aforementioned display apparatus according to the first embodiment of the present invention.

Figure 14:
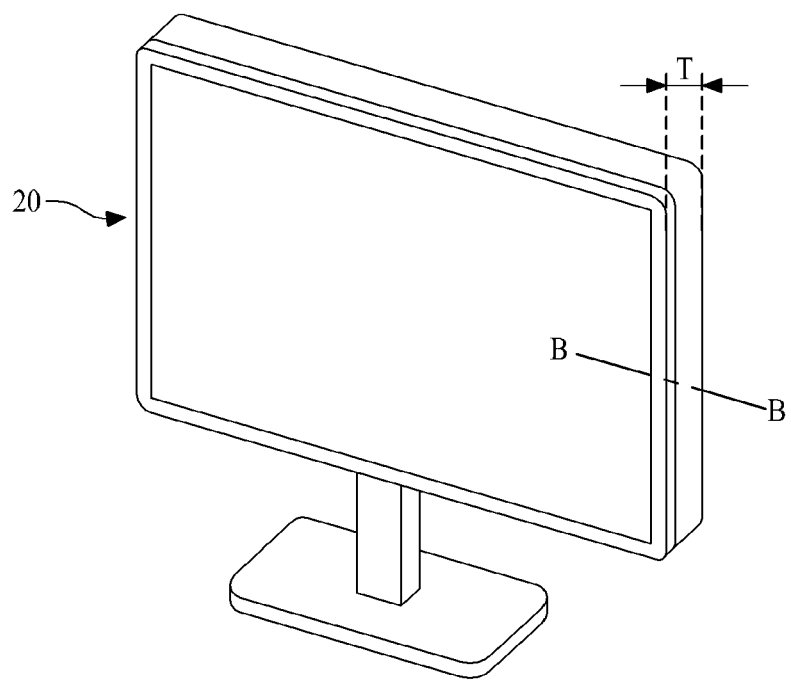
FIG. 14 illustrates a display apparatus used for a monitor or television according to an embodiment of the present invention.
Figure 15:
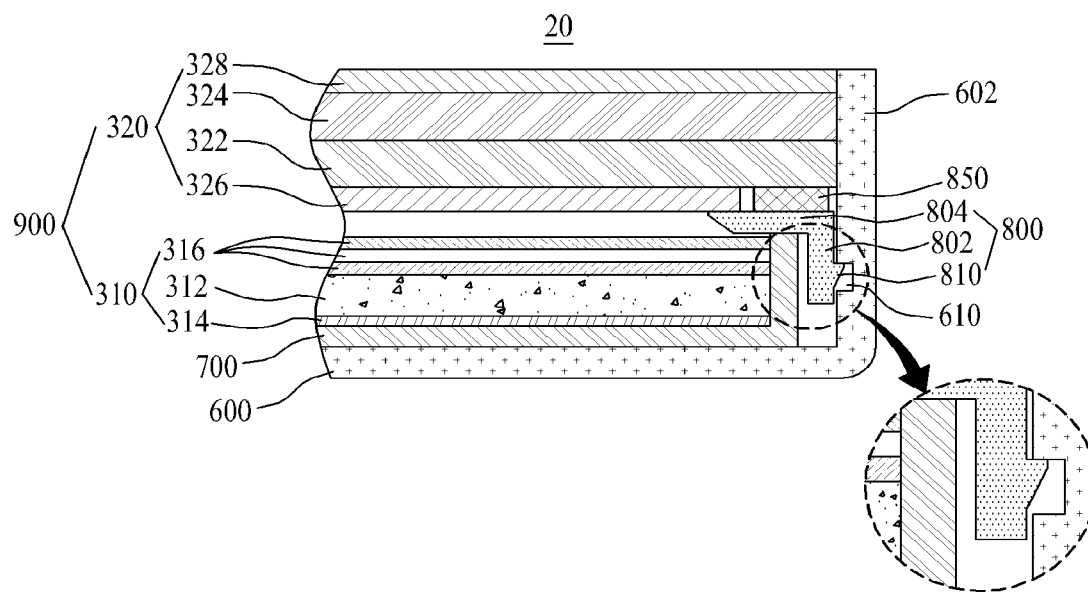
FIG. 15 illustrates a display apparatus according to a seventh exemplary embodiment of the present invention.

FIG. 14 illustrates a display apparatus used for a monitor and television according to an exemplary embodiment of the present invention. FIG. 15 is a cross section view along B-B of FIG. 14, which illustrates a display apparatus according to the seventh exemplary embodiment of the present invention.

Referring to FIG. 15, the display apparatus 20 according to the seventh embodiment of the present invention may include a set cover 600, a support cover 700, a guide frame 800, and a display unit 900.

The set cover 600 may be formed in a rectangular-shaped frame type including a set plate and a set sidewall 602, wherein the set sidewall 602 may be vertically curved from the set plate so as to provide a predetermined space. The set cover 600 may support the guide frame 800 and the display unit 900, and simultaneously cover the lateral side of the guide frame 800. In this case, the set cover 600 may be formed of a plastic material or metal material. For good aesthetic exterior appearance, the set cover 600 may preferably be formed of metal material.

The support cover 700 may be placed onto the set plate of the set cover 600, and the support cover 700 supports the guide frame 800 and the display unit 900. For this, the support cover 700 may comprise a support plate which is placed onto the set plate of the set cover 600; and a support sidewall which may be vertically curved from the support plate. Preferably, the support cover 700 may be formed of the metal material so as to smoothly dissipate heat generated in the display unit 900. The support cover 700 may be connected to the set cover 600 through the use of an adhesive member (for example, double-sided tape) or coupling member (for example, screw). Preferably, the support cover 700 may be connected to the set cover 600 through the use of a coupling member.

The guide frame 800, which may be placed on the support sidewall of the support cover 700, supports the display unit 900. Also, the guide frame 800 may be connected to the set cover 600. For this, the guide frame 800 may be formed in a rectangular band, which comprises a guide sidewall 802, a supporter 804, and a plurality of first coupling members 810.

The guide sidewall 802 facing toward the set sidewall 602 may be formed in parallel to the set sidewall 602, and the guide sidewall 802 may be inserted between the support sidewall of the support cover 700 and the set sidewall 602.

The supporter 804 may be curved from an upper end of the guide sidewall 802 so that the supporter 804 may be placed onto the support sidewall of the support cover 700, to thereby support the display unit 900.

The plurality of first coupling members 810 may be formed in the guide sidewall 802, and may be connected to the set sidewall 602 of the set cover 600. For this, the plurality of first coupling members 810 may protrude from the outer surface of the guide sidewall 802, wherein each of the plural first coupling members 810 may include a stepped surface, and a slant surface which may extend from the stepped surface while being inclined by a predetermined angle.

In the inner surface of the set sidewall 602, a plurality of second coupling members 610 may be formed to be respectively coupled to the plurality of first coupling members 810. Each of the plurality of second coupling members 610 may be formed in a groove shape and may be coupled to the slant surface of each of the plurality of first coupling members 810, to thereby prevent a separation of the guide frame 600. Here, the aforementioned separation hole shown in FIGS. 8 and 9 may be formed in the plurality of second coupling members 610, and the separation hole may be sealed by the sealing cap.

Each of the plurality of first coupling members 810 may be inserted into and coupled to each of the second coupling members 610, whereby the set cover 600 and the guide frame 800 may be connected to each other.

As explained in the first embodiment of the present invention, the display unit 900 may be formed of the liquid crystal display unit including the backlight unit 310 and the liquid crystal display panel 320; or may be formed of the light-emitting display unit including the light-emitting display panel, and their detailed explanations will be omitted.

If the display unit 900 corresponds to the liquid crystal display unit, the backlight unit 310 may be received in and supported by the support cover 700; and the liquid crystal display panel 320 may be placed onto and connected to the supporter 804 of the guide frame 800 through the use of adhesive member 850 (for example, double-sided tape).

If the display unit 900 corresponds to the light-emitting display unit, the light-emitting display unit may comprise the light-emitting display panel without the backlight unit. Thus, the light-emitting display panel may be placed onto and connected to the supporter 804 of the guide frame 800 through the use of adhesive member 850 (for example, double-sided tape). At this time, the support cover 700 may be formed in a flat plate for dissipation of the heat generated in the light-emitting display panel, or may be omitted.

Figure 16:
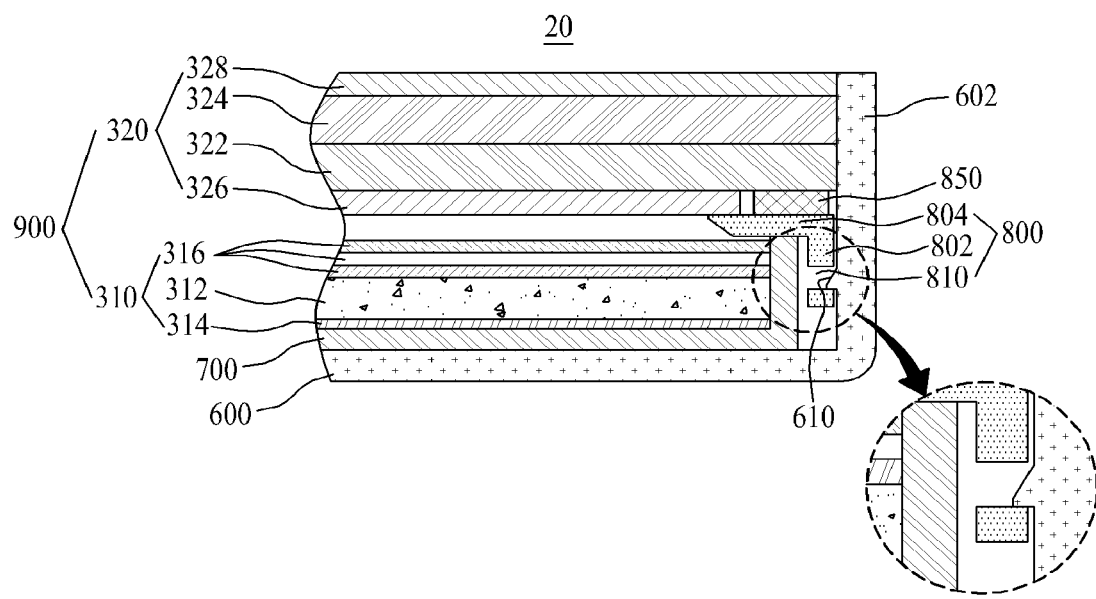
FIG. 16 illustrates another exemplary embodiment of first and second coupling members shown in FIG. 15.

In the display apparatus 20 according to the seventh embodiment of the present invention, the plurality of first coupling members 810 may be formed in the protrusion type along the guide sidewall 802, and the plurality of second coupling members 610 may be formed in the groove type along the set sidewall 602, but not necessarily. The first and second coupling members 810 and 610 may be formed in various shapes for their coupling. For example, as shown in FIG. 16, the plurality of first coupling members 810 may be formed as a groove or hole along the guide sidewall 802; and the plurality of second coupling members 610 may be formed as a protrusion along the set sidewall 602.

In the display apparatus 20 according to the seventh embodiment of the present invention, the display unit 900 may be supported by the guide frame 800, and the guide frame 800 and the set cover 600 may be connected to each other. This may provide the same effects as those of the aforementioned display apparatus according to the first embodiment of the present invention.

Figure 17:
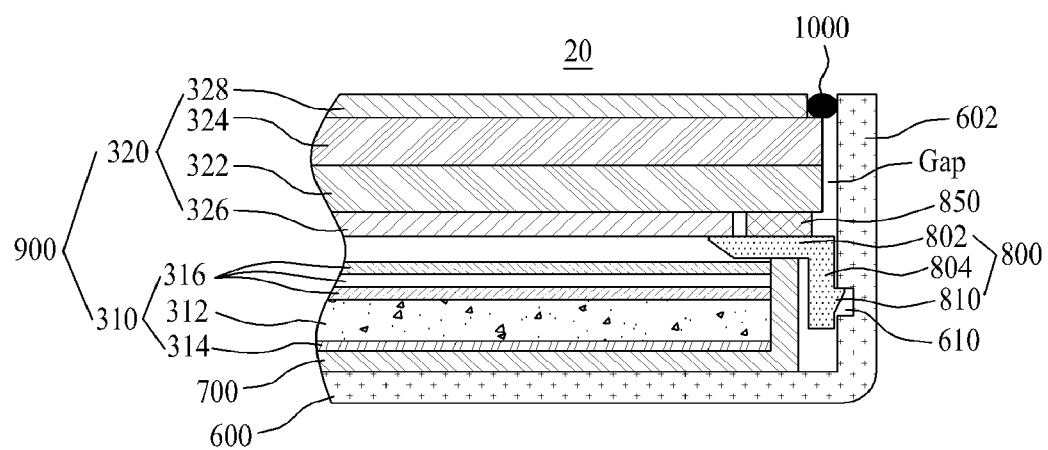
FIG. 17 illustrates a display apparatus according to a eighth exemplary embodiment of the present invention.

FIG. 17 illustrates a display apparatus according to an eighth exemplary embodiment of the present invention.

Referring to FIG. 17, the display apparatus 20 according to the eighth embodiment of the present invention may include a set cover 600, a support cover 700, a guide frame 800, a display unit 900, and a sealing member 1000. Except that the sealing member 1000 may be additionally provided, the display unit 20 according to the eighth embodiment of the present invention may be identical in structure to the display unit according to the seventh embodiment of the present invention shown in FIG. 15 or 16, whereby a detailed explanation for the same parts will be omitted.

The sealing member 1000 according to the first embodiment of the present invention may be formed in a ring shape to be inserted into a gap between a lateral side of a liquid crystal display panel 320 and a set sidewall 602, to thereby seal the gap. This may be identical to the sealing member 400 of the first embodiment in the aforementioned display apparatus according to the second embodiment of the present invention.

In the same manner as the sealing member 400 shown in FIG. 5, the sealing member 1000 according to the second embodiment of the present invention may be formed in a pin shape and may be inserted into the gap between the lateral side of the liquid crystal display panel 320 and the set sidewall 602 so as to seal the gap, wherein the pin-shaped sealing member 1000 may comprise a semicircular head, and a head supporter for supporting the semicircular head.

In the same manner as the sealing member 400 shown in FIG. 7, the sealing member 1000 according to the third embodiment of the present invention may be formed in a film type which may be adhered to the upper edge of the liquid crystal display panel 320 and simultaneously to the partial portion of the upper surface of the set sidewall 602, to thereby seal the gap between the lateral side of the liquid crystal display panel 320 and the set sidewall 602.

Meanwhile, if the film-type sealing member 1000 is adhered to the entire upper surface of the set sidewall 602, the sealing member 1000 may be peeled off by a user's contact. In this respect, the sealing member 1000 may be adhered to the partial portion of the upper surface of the set sidewall 602. For this, a sealing member adhesion groove (not shown) may be formed in the upper surface of the set sidewall 602, and the sealing member 1000 may be adhered to the sealing member adhesion groove. Accordingly, the film-type sealing member 1000 may be adhered to the liquid crystal display panel 320, that is, between the upper edge of upper polarizing plate and the sealing member adhesion groove of the set sidewall 602, to thereby seal the gap between the lateral side of the liquid crystal display panel 320 and the set sidewall 602.

Figure 18:
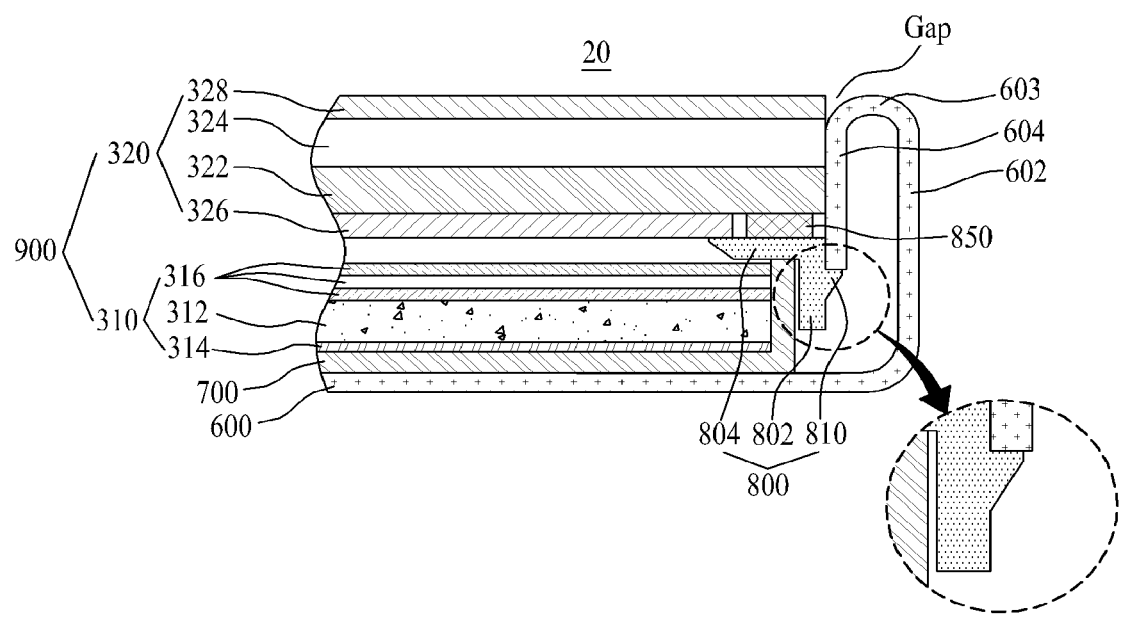
FIG. 18 illustrates a display apparatus according to a ninth exemplary embodiment of the present invention.

FIG. 18 illustrates a display apparatus according to a ninth exemplary embodiment of the present invention.

Referring to FIG. 18, the display apparatus 20 according to the ninth embodiment of the present invention may include a set cover 600, a support cover 700, a guide frame 800, and a display unit 900. Except the set cover 600, the display apparatus 20 according to the ninth embodiment of the present invention may be identical in structure to the display apparatus according to the seventh or eighth embodiment of the present invention shown in FIGS. 15 to 17, whereby a detailed explanation for the same parts will be omitted.

The set cover 600 may comprise a set plate, a set sidewall 602, a bending part 603, and an inner sidewall 604.

The set plate may support the guide frame 800 and the display unit 900.

The set sidewall 602 may be vertically curved from the set plate so as to provide a predetermined space.

The bending part 603 with a predetermined curvature may be bent from one end of the set sidewall 602 toward the display unit 900. The bending part 603 may be exposed externally so as to cover the lateral side of the display unit 900, whereby the bending part 603 forms the frontal edge of the display unit 900.

The inner sidewall 604 may be vertically extended from one end of the bending part 603 while being in parallel to the set sidewall 602, and may then be connected to a first coupling member 810 of the guide frame 800. That is, a stepped surface of the first coupling member 810 in the guide frame 800 may be connected to a lower end of the inner sidewall 104 so that the set cover 600 and the guide frame 800 may be connected to each other. Here, the inner sidewall 604 may be defined as a second coupling member connected to the first coupling member 810.

The display apparatus 20 according to the ninth embodiment of the present invention may further comprise the sealing member (not shown) for sealing the gap between the liquid crystal display panel 320 and the set sidewall 602. At this time, the sealing member may be formed in the ring shape shown in FIG. 4; or may be formed in the pin shape shown in FIG. 5.

In the display apparatus 20 according to the ninth embodiment of the present invention, the inner sidewall 604 in the set sidewall 602 of the set cover 600 may be connected to the guide frame 800, and the frontal edge of the display unit 900 may be formed by the bending part 603, to thereby decrease a total thickness of the display apparatus, and to realize the good aesthetic exterior appearance of the display apparatus.

Figure 19:
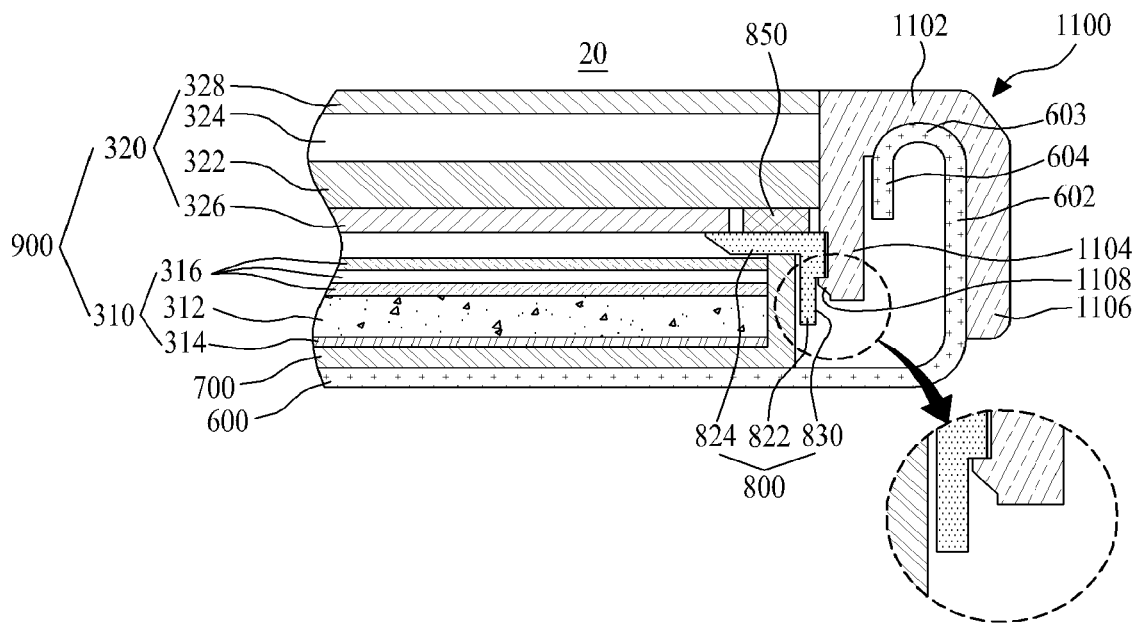
FIG. 19 illustrates a display apparatus according to a tenth exemplary embodiment of the present invention.

FIG. 19 illustrates a display apparatus according to a tenth exemplary embodiment of the present invention.

Referring to FIG. 19, the display apparatus 20 according to the tenth embodiment of the present invention may include a set cover 600, a support cover 700, a guide frame 800, a display unit 900, and an edge frame 1100. Except the guide frame 800 and edge frame 1100, the display apparatus 20 according to the tenth embodiment of the present invention may be identical in structure to the display apparatus according to the ninth embodiment of the present invention shown in FIG. 18, whereby a detailed explanation for the same parts will be omitted. However, while the display apparatus according to the ninth embodiment of the present invention may have the structure for connecting the set cover 600 and the guide frame 800 to each other, the display apparatus according to the tenth embodiment of the present invention may have the structure for connecting the guide frame 800 and the edge frame 1100 to each other.

The guide frame 800 may support the display unit 900 while being placed onto a support sidewall of the support cover 700; and the guide frame 800 may be connected to the edge frame 1100. For this, the guide frame 800 may be formed in a rectangular band, which may comprise a guide sidewall 822, a supporter 824, and a first coupling member 830.

The guide sidewall 822 facing toward a set sidewall 602 of the set cover 600 may be formed in parallel to the set sidewall 602, and the guide sidewall 822 may be inserted between the support sidewall of the support cover 700 and an inner sidewall 604 of the set cover 600.

The supporter 824 may be curved from an upper end of the guide sidewall 822 so that the supporter 824 may be placed onto the support sidewall of the support cover 700, to thereby support the display unit 900. That is, the supporter 824 may be connected to a rear surface of a liquid crystal display panel 320 of the display unit 900 through the use of adhesive member 850.

The first coupling member 830 may be hollowly formed to have a stepped surface in the outer lower surface of the guide sidewall 822, and is connected to the edge frame 1100.

The edge frame 1100 may be formed in shape "∩" to be connected to the guide frame 200, to thereby form the edge of the display unit 900. For this, the edge frame 1100 may comprise a front part 1102, an inner protrusion 1104, an outer protrusion 1106, and a plurality of second coupling members 1108.

The front part 1102, which may be arranged to be in contact with the lateral side of the display unit 900, may cover the space between the lateral side of the liquid crystal display panel 320 and a bending part 603, and also may cover the entire sides of the bending part 603, to thereby form the edge of the display unit 900.

The inner protrusion 1104, which may vertically protrude from one end of the front part 1102, may be inserted into the space between the lateral side of the liquid crystal display panel 320 and the inner sidewall 604 of the set cover 600, to thereby seal the space between the lateral side of the liquid crystal display panel 320 and the bending part 603.

The outer protrusion 1106, which may vertically protrude from the other end of the front part 1102, may cover the outer sides of the set sidewall 602.

The set sidewall 602, bending part 603, and inner sidewall 604 may be inserted into the ∩-shaped space prepared between the inner protrusion 1104 and the outer protrusion 1106.

The plurality of second coupling members 1108 may be provided at fixed intervals, wherein the plurality of second coupling members 1108 may protrude from the outer surface of the inner protrusion 1104 toward the guide frame 800. Each of the plural second coupling members 1108 may include a slant portion which is provided for a smooth connection to the guide frame 800; and a stepped portion which may be coupled to the stepped surface of the first coupling member 830 in the guide frame 800.

In the display apparatus 20 according to the tenth embodiment of the present invention, the structures provided at the lateral side of the liquid crystal display panel 320 may be covered by the edge frame 1100 connected to the guide frame 800, to thereby prevent the foreign matters from coming into the inside of the display apparatus. This provides the same effects as those of the aforementioned display apparatus according to the seventh embodiment of the present invention.

Figure 20:
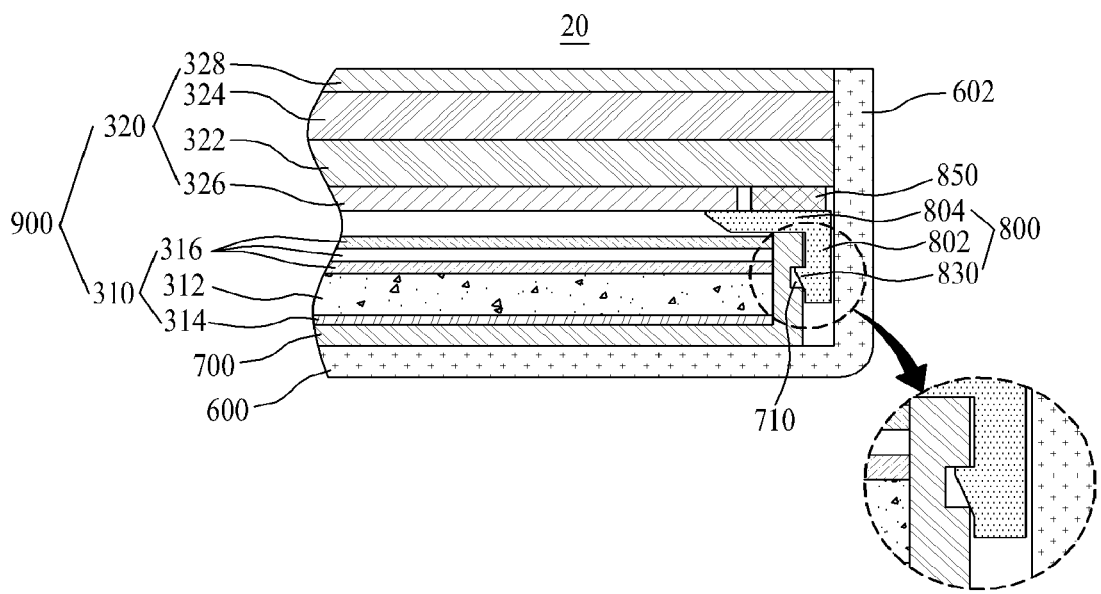
FIG. 20 illustrates a display apparatus according to an eleventh exemplary embodiment of the present invention.

FIG. 20 illustrates a display apparatus according to an eleventh exemplary embodiment of the present invention.

Referring to FIG. 20, the display apparatus 20 according to the eleventh embodiment of the present invention may include a set cover 600, a support cover 700, a guide frame 800, and a display unit 900. Except that the support cover 700 and the guide frame 80 may be connected to each other, the display apparatus 20 according to the eleventh embodiment of the present invention may be identical in structure to the display apparatus according to the seventh or eighth embodiment of the present invention shown in FIGS. 15 to 17, whereby a detailed explanation for the same parts will be omitted.

The support cover 700, which may be received in a set plate of the set cover 600, may support the guide frame 800 and the display unit 900. For this, the support cover 700 may comprise a support plate which may be placed onto the set plate of the set cover 600; a support sidewall which may be vertically curved from the support plate; and a plurality of second coupling members 710 which may be hollowly formed at fixed intervals along the support sidewall. Preferably, the support cover 700 may be formed of the metal material so as to smoothly dissipate heat generated in the display unit 900. The support cover 700 may be connected to the set plate of the set cover 600 through the use of an adhesive member (for example, double-sided tape) or a coupling member (for example, screw). Preferably, the support cover 700 is connected to the set plate of the set cover 600 through the use of a coupling member.

The guide frame 800, which may be placed onto the support sidewall of the support cover 700, supports the display unit 900; and the guide frame 800 may be connected to the support sidewall of the support cover 700. For this, the guide frame 800 may be formed in a rectangular band, which comprises a guide sidewall 802, a supporter 804, and a plurality of first coupling members 830.

The guide sidewall 802 facing toward the set sidewall 602 may be formed in parallel to the set sidewall 602, and the guide sidewall 802 may be inserted between the support sidewall of the support cover 700 and the set sidewall 602.

The supporter 804 may be curved from an upper end of the guide sidewall 802 so that the supporter 804 may be placed onto the support sidewall of the support cover 700, to thereby support the display unit 900.

The plurality of first coupling members 830 may be formed in the guide sidewall 802, and are connected to the second coupling member 710 of the support cover 700. For this, the plurality of first coupling members 830 may protrude from the outer surface of the guide sidewall 802, wherein each of the plural first coupling members 830 may include a stepped surface, and a slant surface which may extend from the stepped surface while being inclined by a predetermined angle.

According as each of the plural first coupling members 830 may be inserted into and coupled to each of the plural second coupling members 710, the support cover 700 and the guide frame 800 may be connected to each other.

In the display apparatus 20 according to the eleventh embodiment of the present invention, the plurality of first coupling members 830 may be formed in the protrusion type along the guide sidewall 802, and the plurality of second coupling members 710 may be formed in the groove type along the support sidewall, but not necessarily. The first and second coupling members 830 and 710 may be formed in various shapes for their coupling. For example, the plurality of first coupling members 810 may be formed in the shape of groove or hole along the guide sidewall 802; and the plurality of second coupling members 710 may be formed in the shape of a protrusion along the support sidewall.

The display apparatus 20 according to the eleventh embodiment of the present invention may further comprise the sealing member (not shown) for sealing a gap (not shown) between a lateral side of a liquid crystal display panel 320 and the set sidewall 602. At this time, the sealing member may be formed in the ring shape, pin shape, or film type shown in FIG. 4, 5, or 7.

The display apparatus 20 according to the eleventh embodiment of the present invention may provide the same effects as those of the display apparatus according to the seventh embodiment of the present invention.

For the aforementioned explanation, the display apparatus 10 shown in FIGS. 2 to 13 may be used for a notebook computer, and the display apparatus 20 shown in FIGS. 15 to 20 may be used for a monitor or television, but not necessarily. That is, the display apparatus 10 shown in FIGS. 2 to 13 may be used for a monitor, television, or mobile device, and the display apparatus 20 shown in FIGS. 15 to 20 may be used for a notebook computer or mobile device.

As mentioned above, the guide frame for supporting the display unit may be connected to the set cover, so that it is possible to decrease the total thickness of the device by innovatively removing the related art lower and upper cases, and the front cover of the manufactured device.

In addition, the edge width of the display unit may be decreased and the step coverage of the edge portion is minimized, to thereby manufacture the display apparatus having the novel design with the improved aesthetic exterior appearance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
a set cover exposed to an external side of the display apparatus and forming a storage space;
a guide frame connected to the set cover and disposed in the storage space; and
a display panel placed onto the guide frame, wherein a top edge of the display panel is exposed externally to the display apparatus,
wherein the set cover comprises:
a set plate for forming the storage space;
a set sidewall curved from the set plate;
a bending part with a predetermined curvature bent from one end of the set sidewall toward a lateral side of the display panel;
an inner sidewall vertically extended from an end of the bending part in parallel to the set sidewall, the inner sidewall connected to the guide frame; and
a space provided between the set sidewall and the inner sidewall,
wherein the bending part is exposed externally so as to cover the lateral side of the display panel, and the bending part forms an edge of the display panel,
wherein the guide frame comprises a guide sidewall to be in parallel to the inner sidewall and a first coupling member in an outer surface of the guide sidewall,
wherein the inner sidewall is spaced apart from the set sidewall with the space interposed therebetween, and an end of the inner sidewall is connected to the first coupling member of the guide frame.

2. The display apparatus according to claim 1, further comprising a sealing member sealing a gap between the lateral side of the display panel and the bending part of the set cover.

3. The display apparatus according to claim 2, wherein the sealing member is inserted into the gap between the lateral side of the display panel and the bending part of the set cover.

4. The display apparatus according to claim 2, wherein the sealing member comprises a head which covers the gap between the lateral side of the display panel and the bending part of the set cover; and
a head supporter which is inserted into the gap between the lateral side of the display panel and the bending part of the set cover.

5. The display apparatus according to claim 1, wherein the guide frame further comprises a supporter protruding from the guide sidewall, the supporter for supporting the display panel.

6. The display apparatus according to claim 5, wherein the supporter comprises:
a first part protruding from the guide sidewall in an opposite direction to the set sidewall;
a curved part curved from the first part toward the set plate; and
a second part curved from the curved part and placed onto the set plate.

7. The display apparatus according to claim 6, wherein further comprising a backlight unit received in the storage space and placed onto the second part, and
wherein the display panel is placed onto the first part, the display panel displays images by modulating transmittance of light emitted from the backlight unit.

8. The display apparatus according to claim 1, further comprising:
a support cover placed in the storage space, the support cover supports the guide frame; and
a backlight unit arranged in the support cover,
wherein the display panel displays images by modulating transmittance of light emitted from the backlight unit.

9. A display apparatus comprising:
a set cover having a storage space prepared by a set plate and a set sidewall curved from the set plate;
a guide frame placed onto the storage space;
a display panel placed onto the guide frame; and
an edge frame inserted into a space between a lateral side of the display panel and the set sidewall, and directly connected to the guide frame by coupling a first coupling member of the guide frame and a second coupling member of the edge frame so as to cover a top surface and a lateral side of the set sidewall,
wherein the edge frame is exposed to the external so as to cover the lateral side of the display panel, and the edge frame forms an edge of the display panel without covering a top edge of the display panel, and
wherein the edge frame comprises:
a front part arranged to be in contact with the lateral side of the display panel, the front part for forming the edge of the display panel;
an inner protrusion vertically protruding from one end of the front part, the inner protrusion inserted into the lateral side of the display panel and the set sidewall;
an outer protrusion vertically protruding from the other end of the front part, the outer protrusion for covering an outer surface of the set sidewall; and
the second coupling member in a lateral surface of the inner protrusion, the second coupling member coupled to the first coupling member of the guide frame.

10. The display apparatus according to claim 9, wherein the guide frame comprises:
a guide sidewall to be in parallel to the set cover;
the first coupling member in an outer surface of the guide sidewall, the first coupling member connected to the edge frame; and
a supporter protruding from the guide sidewall to be in an opposite direction to the set sidewall, the supporter for supporting the display panel.

11. The display apparatus according to claim 10, wherein the set cover further comprises a bending part with a predetermined curvature bent from one end of the set sidewall toward the lateral side of the display panel, and
wherein the front part of the edge frame covers the bending part of the set cover.

12. The display apparatus according to claim 10, wherein the supporter comprises:
a first part protruding from the guide sidewall in an opposite direction to the set sidewall;
a curved part curved from the first part toward the set plate; and
a second part curved from the curved part and placed onto the set plate.

13. The display apparatus according to claim 12, wherein further comprising a backlight unit received in the storage space and placed onto the second part, and
wherein the display panel is placed onto the first part, the display panel displays images by modulating transmittance of light emitted from the backlight unit.

14. The display apparatus according to claim 9, further comprising:
a support cover placed in the storage space, the support cover supports the guide frame; and
a backlight unit arranged in the support cover,
wherein the display panel displays images by modulating transmittance of light emitted from the backlight unit.

15. A display apparatus comprising:

a display unit including a display panel and a backlight unit, the backlight including a reflective sheet;

a unitary set cover receiving and covering the display unit except a top surface of the display panel;

a guide frame formed under the display panel and supporting a rear surface of a display panel and connected to the set cover;

a unitary support cover covering the backlight unit except a top surface of the backlight unit and supporting the backlight unit and the guide frame, wherein the support cover comprises a support plate and a support sidewall which is vertically curved from the support plate; and a sealing member sealing a gap between a lateral side of the display panel and the set cover, wherein the reflective sheet is in contact with the support cover and wherein the support cover is in contact with the set cover, wherein support cover is formed of the metal material, wherein the guide frame comprises guide sidewall which is in parallel to the set sidewall and supporter which is curved from an upper end of the guide sidewall, wherein the supporter is supported by the support sidewall and supports the rear surface of the display panel, wherein the guide sidewall surrounds a lateral side of the support sidewall, wherein a top edge of the display panel is exposed externally to the display apparatus without being covered by the set cover, and wherein a lateral side of guide sidewall of the guide frame and a lateral side of the display panel are completely covered by the set cover.

16. The display apparatus according to claim 15, wherein the set cover comprises:

a set plate supporting the support plate; and a set sidewall curved from the set plate, wherein the set sidewall completely covers the lateral side of the display panel and the lateral side of guide sidewall of the guide frame.

17. The display apparatus according to claim 16, wherein the sealing member is inserted into a gap between the lateral side of the display panel and the set sidewall of the set cover.

18. The display apparatus according to claim 17, wherein the sealing member is formed in a ring shape.

19. The display apparatus according to claim 1, wherein the inner sidewall of the set cover is directly contacted with the lateral side of the display panel.

\* \* \* \* \*